UNITED STATES PATENT OFFICE.

HENRY V. DUNHAM, OF MOUNT VERNON, NEW YORK.

PROCESS OF TREATING NUTS AND PRODUCT THEREOF.

1,307,090.  Specification of Letters Patent. Patented June 17, 1919.

No Drawing. Application filed January 22, 1919. Serial No. 272,547.

*To all whom it may concern:*

Be it known that I, HENRY V. DUNHAM, a citizen of the United States, residing at Mount Vernon, in the county of Westchester and State of New York, have invented certain new and useful Improvements in Processes of Treating Nuts and Product Thereof, of which the following is a specification.

The present invention relates to cooked peanuts or other nuts, which also may be salted if desired, and has for its object to produce cooked nuts which are much less liable to decomposition or spoiling than those heretofore produced by somewhat analogous procedure, and embraces both the process and the product produced thereby. For the purpose of illustration, peanuts will be hereinafter referred to, but it is to be understood that other varieties of nuts may be treated as herein described, with the production of useful products.

In the manufacture of salted peanuts it has heretofore been the custom to first blanch the nuts after which the meats are placed in a bath of oil, peanut oil or olive oil having been found very suitable, and the oil then heated to a temperature sufficient to cook the nuts. At the end of the cooking operation the nuts are removed from the bath of oil, drained, and then sprinkled with salt or rolled in salt, whereby a sufficient amount of salt adheres to the surface of the nuts to give the desired flavor, and the nuts are then usually placed in paraffined bags or envelops and are ready for sale. In some cases the hulls are taken off the nuts and the thin skin is left on the meats.

I have now discovered that a superior article can be produced, if instead of the peanut oil or olive oil heretofore generally used, a heavy mineral oil, highly purified, be substituted. As a preferred oil to employ, paraffinum liquidum may be mentioned, it being understood that a highly purified mineral oil, free or substantially free from unsaturated hydrocarbons, should be used.

In the preferred form of the process the peanuts are first shelled in any suitable manner, and the brown skins preferably removed, after which they are placed in the bath of paraffinum liquidum heated to a temperature of about 280 to 300° F., and the nuts are then held in this liquid, at the temperature stated, until the peanuts are properly cooked, and the desired color is produced. The peanuts are then removed from the bath of hot oil, drained and rolled in salt in the usual manner, whereby a certain amount of salt will adhere to the nut meats, which are then ready for packaging and shipping or selling.

The nuts treated according to the present invention are much superior to those produced by the prior processes above referred to, since the paraffinum liquidum does not become rancid upon standing, and it will be understood that after the nuts are treated and placed in the receptacles, it may be a considerable time before they reach the ultimate consumer, during which time peanut oil or olive oil is liable to undergo rancidification.

The paraffinum liquidum may be used over and over, until it has taken up a substantial amount of peanut oil from the peanuts under treatment, whereupon it should be purified from ester-oils before further use.

The nuts treated will be found to be impregnated, especially the surface portions of each of the nuts, with paraffinum liquidum which acts to prevent oxidation and rancidification of the vegetable oil in the interior of the nuts.

What I claim is:

1. A process of treating nut meats which comprises subjecting the same to the action of heavy purified mineral oil at a cooking temperature until sufficiently cooked and colored.

2. In the manufacture of salted peanuts, the step of subjecting blanched peanuts to a bath of paraffinum liquidum at a temperature of about 280 F. to 300° F. until cooked.

3. Cooked nut meats at least partially impregnated with heavy purified mineral oil.

4. Cooked shelled peanuts, the outer portions of which are impregnated with a sealing coat of paraffinum liquidum.

In testimony whereof I affix my signature.

HENRY V. DUNHAM.